C. Root. Fly Wheel.

No. 117,115 — Patented Jul 18 1871

Witnesses:
A. Bennerkendorf
Wm. H. C. Smith

Inventor:
C. Root
per [signature]
Attorneys.

UNITED STATES PATENT OFFICE.

CHARLES ROOT, OF CLEVELAND, OHIO.

IMPROVEMENT IN FLY-WHEELS.

Specification forming part of Letters Patent No. 117,115, dated July 18, 1871.

*To all whom it may concern:*

Be it known that I, CHARLES ROOT, of Cleveland, in the county of Cuyahoga and State of Ohio, have invented a new and Improved Fly-Wheel; and I do hereby declare that the following is a full, clear, and exact description thereof, which will enable others skilled in the art to make and use the same, reference being had to the accompanying drawing forming part of this specification.

This invention relates to improvements in the construction and mode of applying fly or balance-wheels to their shafts; and it consists in a novel arrangement of apparatus for holding the wheel by friction devices, which will allow it to continue in motion a short time when the machinery is suddenly brought to a stand, to relieve it of the strain due to the momentum of the wheel.

Figure 6:
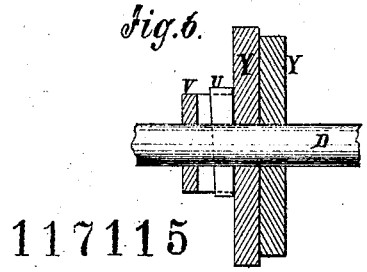
Figure 1:
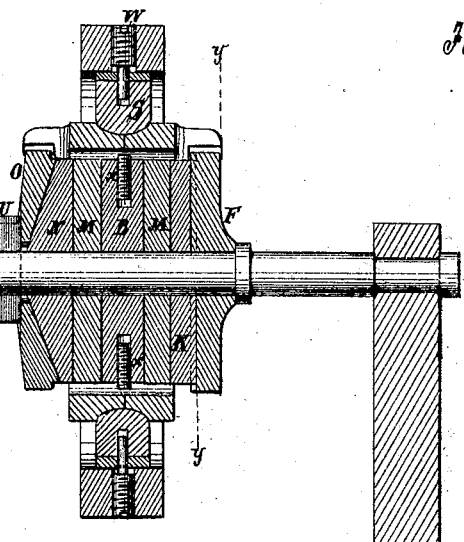
Figure 5:
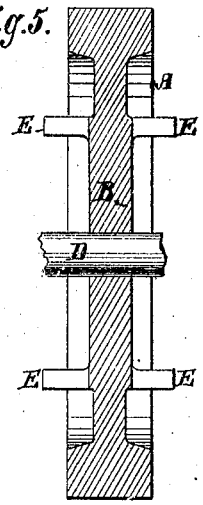
Figure 2:
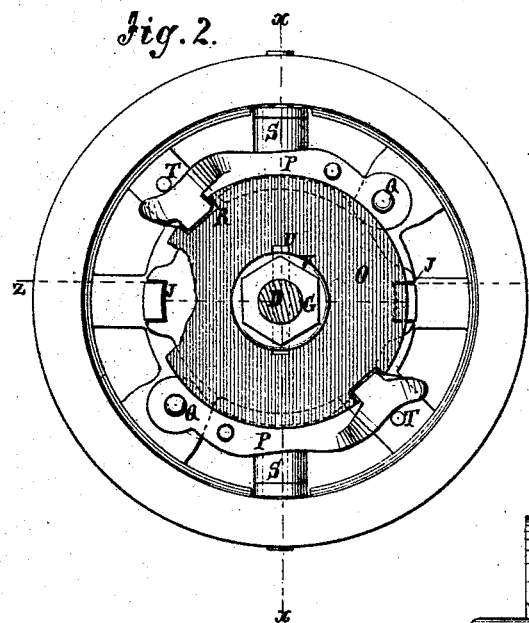
Figure 3:
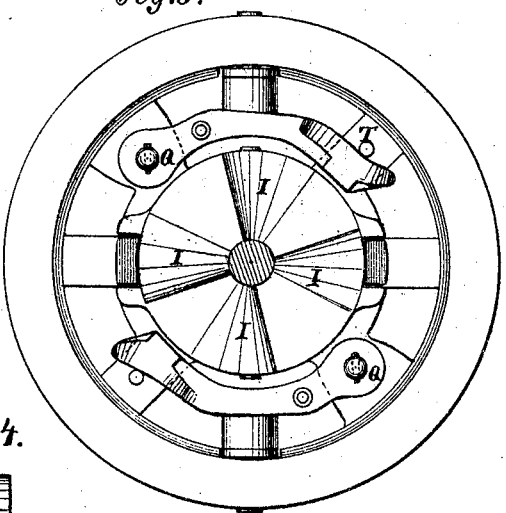
Figure 4:
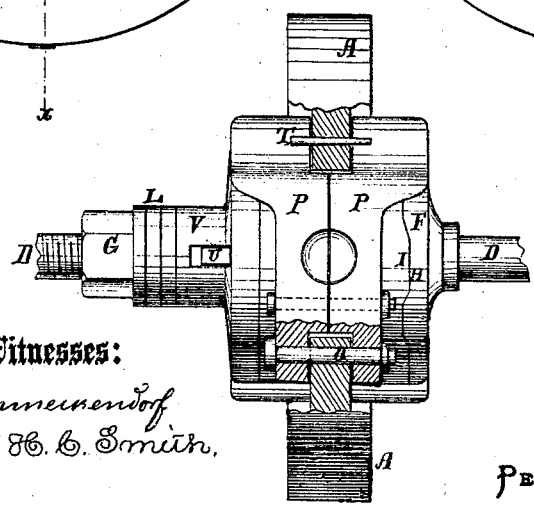

Figure 1 is a sectional elevation of the improved wheel taken on the line $x\,x$ of Fig. 2. Fig. 2 is a side elevation with a part broken out. Fig. 3 is a section on the line $y\,y$ of Fig. 1. Fig. 4 is a face view with the same parts broken out. Fig. 5 is a section of the wheel proper on the line $z\,z$ of Fig. 2; and Fig. 6 is a partial section in the same line that the sectional Fig. 1 is, showing a slight modification of the friction-disks I propose to employ.

Similar letters of reference indicate corresponding parts.

The balance-wheel A has a large central disk, B, with an axial hole fitting on the shaft D loosely. It is also provided with lugs E on the arms perpendicular to them, and parallel with the shaft D. This disk B is to be clamped between friction-disks of different kinds, according to whether it is to be held with greater or lesser power, and in some cases the wheel will be held by pawls in addition to the disks. F is a fixed collar or disk fitted on the shaft to clamp the wheel and the other disks against by a nut, G, on the other side of the wheel screwing on the shaft.

In this example this collar has radial recesses H in its face, in which corresponding projections I on the collar K facing it fit, and on the other side of the wheel there are arranged elastic washers L between the collars and the nut to allow disk K to spring away from collar F to let the wheel continue its motion. This arrangement is used when it is desired to hold the wheel with great power, and, when used, the wood disks K and N are used to take the wear off the wheel. They are caused to turn with it by the lugs E taking into notches in their peripheries, as shown at J. When it is not desired to hold the wheel with such great power the disk K may be shifted, its plane face being placed against the grooved face of F and its grooved face against the plane of the disk B, or the India-rubber washer M introduced between it and the wheel, to act, in conjuction with washers L, to admit of an endwise movement. There may be an elastic disk of this kind on each side of disk B.

Another plan for holding the wheel with greater power than plane disks will, but with less than the power of the grooved disks, is shown by the conical disk O, which will be serviceable in many cases; but for holding it still more powerfully than it can be by either of these modes, I propose to employ in some cases the pawls P, pivoted to one of the arms, as at Q, and engaging in notches R in the peripheries of the disks F and O, which are made fast to the shaft and the springs S for holding the pawls in the notches, so that the said pawls will only be forced out by very great momentum of the wheel, and these pawls may be locked in the notches by pins T passing through the arms of the wheel, past which arms the ends of the pawls lap. The springs S are provided with adjusting-screws W, and the pawls with adjusting-screws X, for regulating the force with which they are held in the notches and the amount they dip in said notches. The disk O is prevented from turning on the shaft D by the key U passing through the collar V and the shaft in any way to allow the disk to be adjusted lengthwise of the shaft; but it may be held in any approved way. For very light wheels I propose to use only plane clamping and friction-disks, as indicated at $y$, Fig. 6.

Having thus described my invention, I claim as new and desire to secure by Letters Patent—

1. The combination, with the fly-wheel A having the disk B and lugs E, of the clamping-disks F O, notched disks N and K, and the elastic washers M, whether the disks F and K be grooved or plane, and the disk N conical, and O concaved, or not, all substantially as specified.

2. The combination, with the clamping-disks F and O and the wheel, of the pawls P, substantially as specified.

CHARLES ROOT.

Witnesses:
J. H. KOEHLER,
HENRY PECK.